United States Patent
Colliou et al.

(10) Patent No.: US 10,458,316 B2
(45) Date of Patent: Oct. 29, 2019

(54) DEVICE FOR CONTROLLING THE AMOUNT OF AIR FED INTO THE INTAKE OF A SUPERCHARGED INTERNAL COMBUSTION ENGINE AND METHOD USING SUCH A DEVICE

(71) Applicant: IFP Energies nouvelles, Rueil-Malmaison (FR)

(72) Inventors: Thierry Colliou, Les Cotes D'arey (FR); Bruno Walter, Chassagny (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 29 days.

(21) Appl. No.: 15/568,030

(22) PCT Filed: Apr. 12, 2016

(86) PCT No.: PCT/EP2016/057985
§ 371 (c)(1),
(2) Date: Oct. 20, 2017

(87) PCT Pub. No.: WO2016/169804
PCT Pub. Date: Oct. 27, 2016

(65) Prior Publication Data
US 2018/0142610 A1    May 24, 2018

(30) Foreign Application Priority Data
Apr. 21, 2015 (FR) .................................. 15 53538

(51) Int. Cl.
*F02B 37/02* (2006.01)
*F02B 37/10* (2006.01)
*F02B 37/16* (2006.01)

(52) U.S. Cl.
CPC ............ *F02B 37/025* (2013.01); *F02B 37/10* (2013.01); *F02B 37/168* (2013.01); *Y02T 10/144* (2013.01)

(58) Field of Classification Search
CPC ...... F02B 37/025; F02B 37/10; F02B 37/168; Y02T 10/144
(Continued)

(56) References Cited

U.S. PATENT DOCUMENTS

| 4,018,053 A | 4/1977 | Rudert et al. |
| 4,373,336 A | 2/1983 | Horler et al. |

(Continued)

FOREIGN PATENT DOCUMENTS

| DE | 2438162 A1 | 2/1976 |
| DE | 2906182 A1 | 8/1980 |

(Continued)

OTHER PUBLICATIONS

International Search Report for PCT/EP2016/057985 dated Jul. 11, 2016; English translation submitted herewith (7 pages).

*Primary Examiner* — Hoang M Nguyen
(74) *Attorney, Agent, or Firm* — Fitch, Even, Tabin & Flannery LLP

(57) ABSTRACT

The present invention is a device for controlling an amount of air fed into the intake of a supercharged internal combustion engine with the engine comprising two exhaust gas outlets (32 and 36) each linked to an exhaust manifold (30 and 34) in at least one cylinder (12₁, 12₂, 12₃, 12₄). A supercharging device (38) comprising a turbo-compressor with a double-intake (50 and 52) turbine (40) is connected to the exhaust gas outlets and to an outside air compressor (44) and to a partial transfer duct of the compressed air from the compressor towards the intakes of the turbine. The partial transfer duct comprises two branches (70 and 72)

(Continued)

which are connected to intakes of the turbine each having a shut-off (74 and 76) which controls circulation of compressed air in the branches. The partial transfer duct is integrated into the casing of the turbo-compressor so that a manner as a length between the outlet of the compressor and the double intakes of the turbine is as short as possible to achieve a limited size and optimized response time.

20 Claims, 3 Drawing Sheets

(58) Field of Classification Search
USPC .................................................. 60/605.1–612
See application file for complete search history.

(56) References Cited

U.S. PATENT DOCUMENTS

| | | | |
|---|---|---|---|
| 4,404,805 A | 9/1983 | Curtil | |
| 4,517,802 A * | 5/1985 | Kobayashi | F02B 37/166 60/606 |
| 8,230,675 B2 * | 7/2012 | Pursifull | F02M 26/36 123/568.12 |
| 2009/0038309 A1 * | 2/2009 | Cocca | F02B 37/013 60/603 |
| 2009/0049835 A1 | 2/2009 | Onodera | |
| 2012/0222419 A1 * | 9/2012 | Hittle | F02M 26/22 60/605.1 |
| 2016/0215712 A1 * | 7/2016 | Yokoyama | F01N 5/02 |

FOREIGN PATENT DOCUMENTS

| | | |
|---|---|---|
| DE | 102012202857 A1 | 8/2013 |
| EP | 2503130 A2 | 9/2012 |
| FR | 1293459 A | 5/1962 |
| FR | 2478736 A1 | 9/1981 |
| GB | 2438360 A | 11/2007 |
| JP | S57200618 A | 12/1982 |
| WO | 2015/052837 A1 | 3/2017 |

* cited by examiner

DEVICE FOR CONTROLLING THE AMOUNT OF AIR FED INTO THE INTAKE OF A SUPERCHARGED INTERNAL COMBUSTION ENGINE AND METHOD USING SUCH A DEVICE

CROSS REFERENCE TO RELATED APPLICATIONS

Reference is made to International Application No. PCT/EP2016/057985 filed Apr. 12, 2016, and French Application No. 15/53.538 filed Apr. 21, 2015, which are incorporated herein by reference in their entirety.

BACKGROUND OF THE INVENTION

Field of the Invention

The present invention relates to an improved device for controlling the amount of air fed into the intake of a supercharged internal combustion engine and in particular a stationary engine, or for an automotive or industrial vehicle, and to a method of controlling the amount of air for an engine of this kind.

Description of the Prior Art

As is widely known, the power supplied by an internal combustion engine depends on the amount of air introduced into the combustion chamber of the engine with the amount of air being proportional to the density of the air.

It is customary for the amount of air to be increased by compressing the outside air before it is introduced into the combustion chamber. This operation, referred to as supercharging, can be realized by any mechanism, such as a turbo-compressor or a driven compressor which may be centrifugal or volumetric.

In the case of supercharging by a turbo-compressor, the turbo-compressor comprises a single-flow or double-flow rotary turbine joined by a shaft to a rotary compressor. The exhaust gases coming from the engine cross the turbine which is then rotated. This rotation is then transmitted to the compressor which, through its rotation, compresses the outside air before it is introduced into the combustion chamber.

As is better described in French Patent Application No. 2 478 736, in order to be able to increase the amount of compressed air in the combustion chamber of the engine to a significant extent, it is provided that the compression of the outside air by should be increased still further by the compressor.

This is more particularly achieved by increasing the rotation speed of the turbine and therefore of the compressor.

To do this, some of the compressed air leaving the compressor is diverted so that it can be directly fed into the intake of the turbine by being mixed with the exhaust gases. This turbine is then crossed by a larger amount of fluid (mixture of compressed air and exhaust gas), which allows the rotational speed of the turbine and, consequently, that of the compressor to be increased. This increase in speed of the compressor therefore allows the pressure of the outside air to be increased, with the air being compressed in the compressor then being introduced into the combustion chamber of the engine.

To achieve this, the compressed air has a greater density, which allows the amount of air contained in the combustion chamber to be increased.

Although this kind of supercharged engine is satisfactory, it nevertheless presents significant drawbacks.

In effect, the flow of compressed air fed into the intake of the turbine is not correctly controlled, which may result in an engine malfunction.

Hence, by way of example, in the event of an excessive amount of compressed air being diverted to the intake of the turbine, the exhaust gases entering the turbine are cooled excessively by the air and this leads to a drop in the overall performance of the supercharger.

SUMMARY OF THE INVENTION

The present invention addresses the problems referred to above with a device for controlling the amount of air fed into the intake of a supercharged internal combustion engine which allows all the power demands of the engine to be met.

The invention permits a transfer of compressed air from the intake towards the exhaust, even when the average pressure of the compressed air at the intake is lower than that of the exhaust gases. It is sufficient for there to be phases during the operating cycle of the engine in which the pressure at the intake is greater than that existing at the exhaust.

The present invention is modified to be miniaturized and to have a limited impact on the environment of the engine and to improve the response time thereof during transient operation.

Moreover, the present invention is specifically suited for miniaturization. Miniaturization allows easy integration of the device in the environment of an engine, since it is unintrusive and does not restrict the casing of the turbo-compressor.

To this end, the present invention relates to a device for controlling the amount of air fed into the intake of a supercharged internal combustion engine, which has two exhaust gas outlets each linked to an exhaust manifold in at least one cylinder, a supercharger comprising a turbo-compressor with a double-intake turbine connected to the exhaust gas outlets, as well as an outside air compressor. A partial transfer duct directs the compressed air from the compressor towards the intakes of the turbine. The partial transfer duct comprises two branches connected to the intakes of the turbine, with each branch having shut-off controlling the circulation of compressed air in the branches. The partial transfer duct is integrated in the casing of the turbo-compressor to have a short length between the outlet of the compressor and the double intakes of the turbine, provide a limited size and optimized response time.

The partial transfer duct may be disposed on the casing of the turbo-compressor.

The partial transfer duct may be housed in the casing of the turbo-compressor.

The branches may, moreover, each have a non-return check valve.

One of the branches may be connected to the other of the branches by a connecting duct.

The connecting duct may have a shut-off.

The shut-off may comprise proportional valves.

The transfer duct may be housed in the casing of the turbo-compressor when the casing is manufactured at the foundry or when there is specific machining.

The invention likewise relates to a method of controlling the amount of compressed air at the intake of a supercharged internal combustion engine, having two exhaust gas outlets each connected to an exhaust manifold of at least one cylinder, a supercharger with a turbo-compressor and a double-intake turbine connected to the exhaust gas outlets, as well as an external air compressor. A partial transfer duct of the compressed air extends from the compressor towards the turbine intakes, which introduces some of the compressed air leaving the compressor in the exhaust gas intake sections of the turbine, and the transfer duct is disposed on the casing of the turbo-compressor.

The method may involve separating the transfer duct into two branches and controlling the circulation of compressed air in each of the branches by a shut-off.

The method may involve connecting one of the branches to the other of the branches by a connecting duct.

The transfer duct may be part of the casing and may be manufactured at the same time as the foundry casting of the casing.

BRIEF DESCRIPTION OF THE DRAWINGS

Other characteristics and advantages of the invention will become apparent on reading the following description provided simply by way of illustration wherein like reference numberals identify like parts without restriction, and to which are attached.

DETAILED DESCRIPTION OF THE INVENTION

Figure 1:
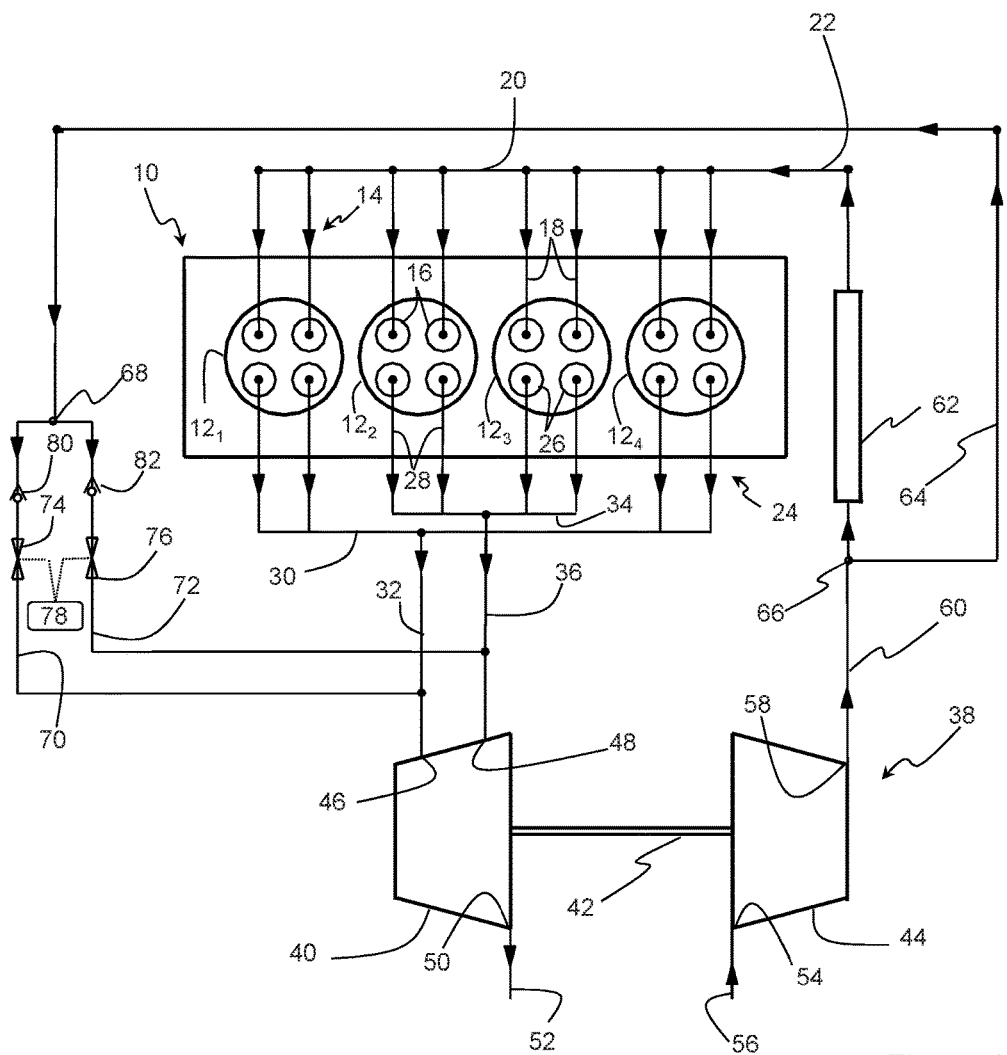
FIG. 1 illustrates an internal combustion engine having a supercharger according to the invention.

In FIG. 1 the internal combustion engine 10 comprises at least two cylinders, which in this case is four cylinders identified by the reference numbers $12_1$ to $12_4$ from the left of the figure.

This engine is preferably a direct-injection internal combustion engine, particularly a diesel engine, but this does not preclude any other kind of internal combustion engine.

Each cylinder comprises an intake 14 with at least one intake valve 16, which is in this case two intake valves each controlling a one intake pipe 18. The intake pipes 18 end at an intake manifold 20 supplied with intake air, such as compressed air, by a supply duct 22.

This cylinder also comprises waste gas exhaust 24 with at least one exhaust valve 26, which in this case is two valves each controlling an exhaust pipe 28. In the example shown, the engine operates according to a combustion sequence referred to as 1-3-4-2. Having taken account of this combustion sequence, the exhaust pipes of the first cylinder $12_1$ and second cylinder $12_4$, which form a first set of at least one cylinder, are connected to a first exhaust manifold 30 with a first exhaust gas outlet 32. The exhaust pipes of the third and fourth 122 and 123, which form a second set of at least one cylinder, are connected to a second exhaust manifold 34 which comprises a second exhaust gas outlet 36.

The two exhaust gas outlets end at a turbo-compressor 38 for compressing the air and, more particularly, at the expansion turbine 40 of the turbo-compressor.

As shown in FIG. 1, the turbo-compressor is a double-intake turbo-compressor, better known as a "twin scroll" turbo-compressor.

This type of turbo-compressor comprises the expansion turbine 40 swept by the exhaust gases which is rotationally connected by a shaft 42 to a compressor 44.

At the turbine, the exhaust gas intake is divided into two sections with a first intake section 46 being connected to the first exhaust gas outlet 32 of the first manifold 30 and a second intake section 48 connected to the second exhaust gas outlet 36 of the second exhaust manifold 34.

The gas discharge conduit 50 of the turbine 40 is connected conventionally to the exhaust line 52 of the engine.

The compressor 44 of the turbo-compressor 38 comprises an outside air intake 54 fed by a supply duct 56. The compressed air outlet 58 of this compressor is connected to the supply duct 22 of the intake manifold 20 by a duct 60.

Advantageously, it may be provided that a compressed air-cooling radiator 62 is placed on the duct 60 between the compressor and the duct 22.

As can be seen more clearly in FIG. 1, a transfer duct 64 allows some of the compressed air leaving the compressor 44 to flow towards the intakes 46 and 48 of the turbine to be circulated.

More accurately, this partial transfer duct starts on the duct 60 at an intersection 66 between the compressor and the cooling radiator 62. According to the present invention, the transfer duct starts very close to the compressed air outlet of the compressor 44. This transfer duct is then separated from a bifurcation point 68 into two branches 70 and 72. The branch 70 ends at the intake 46 of the turbine through its junction with the first exhaust gas outlet 32 and the branch 72 ends at the other intake 48 of the turbine through its junction with the exhaust gas outlet 36.

The transfer duct and its branches are as short as possible between the compressed air outlet of the compressor and the intakes 46 and 48 of the turbine. Hence, the impact of the installation of the partial transfer device on the engine is limited to the immediate environment of the body of the turbo-compressor assembly.

The partial transfer ducts are preferably disposed on the casing of the turbo-compressor and connected to the outlet/intakes. In this variant, the casing of the turbo-compressor is not modified and has a component which is placed on the casing of the turbo-compressor and which is connected to the outlet/intakes. It is in this component that the ducts are housed in such a manner allowing the installation of proportional valves and non-return check valves.

Each branch has shut-off 74 and 76, such as a proportional valve, controlled by a control 78 which may be shared by the two shut-offs. This valve therefore allows the circulation of the compressed air which circulates in the branch to be controlled.

Advantageously, each branch likewise comprises a non-return check valve 80 and 82 which prevents circulation of the compressed air in the branch towards the compressor, while preventing the two branches from being connected. While the engine is running, this configuration benefits from low-pressure exhaust zones occasionally prevailing in the exhaust manifolds to introduce compressed air directly into the turbine and thereby increase the flow of this turbine and, consequently, of the compressor. This likewise makes it possible to have more effective supercharging at low speeds.

During running, if a large quantity of air is needed in the cylinders, the valves 74 and 76 are controlled in terms of opening to introduce compressed air coming from the compressor 44 into the turbine 40.

The compressed air leaving the compressor 44 which circulates in the duct 64 then circulates in the branches 70 and 72 and ends at the exhaust gas intakes 46 and 48 of the turbine 40 to provide excess fluid to the turbine at this part. This configuration which requires shorter ducts allows rapid movement of the compressed air between the compressor and the turbine and limits the size of the device in the environment of the engine to the immediate environment of the casing of the turbo-compressor, which also allows a quicker response time.

Accordingly, the turbine passes not only exhaust gases coming from the outlets 32 and 36 but also compressed air which is added to the exhaust gases. The rotation of the turbine is thereby increased, resulting in an increase in rotation of the compressor and, consequently, an increase in the pressure of the compressed air leaving this compressor.

The valves 74 and 76 are of course controlled by the control 78 which allows the amount of compressed air into the turbine that meets the supercharging needs of the engine.

Figure 2:
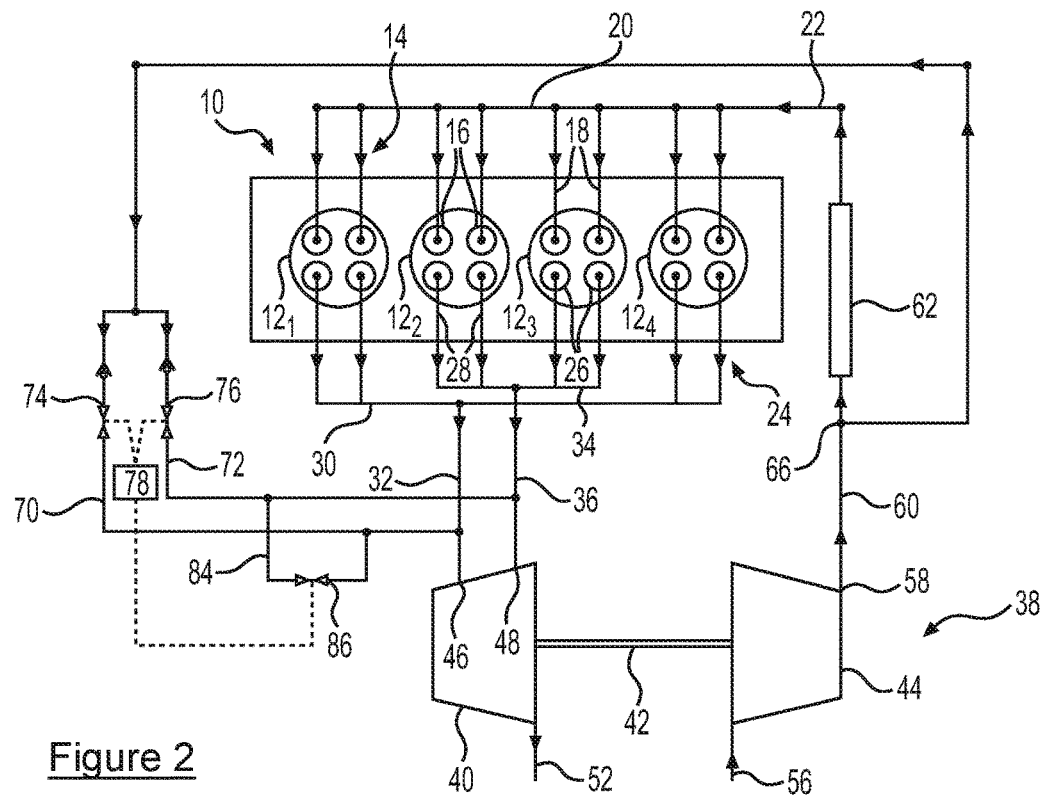
FIG. 2 shows a variant of the internal combustion engine includes the supercharger.

The variant in FIG. 2 differs from FIG. 1 by the placement of a connecting duct 84 between the two branches 70 and 72. This duct is provided with shut-off 86, such as a proportional valve which, in this case, is likewise controlled by the control 78.

One of the ends of this duct is connected to the branch 70 at a point situated between the valve 74 and the exhaust gas outlet 32 and the other of the ends is connected at a point situated between the valve 76 and the exhaust gas outlet 36.

This duct allows control of the fluid communication between the two branches arriving at the turbine.

More accurately, this connecting duct allows some of the compressed air circulating in one of the branches to be diverted, in order to be introduced into the other of the branches by its mixture with the exhaust gases at the intakes of the turbine 40.

Moreover, the connecting duct allows the pressure differential of the exhaust gases (or exhaust pulsing means) of the other branch, which is offset angularly in the engine combustion cycle, to be collected on a branch of the turbine.

Figure 3:
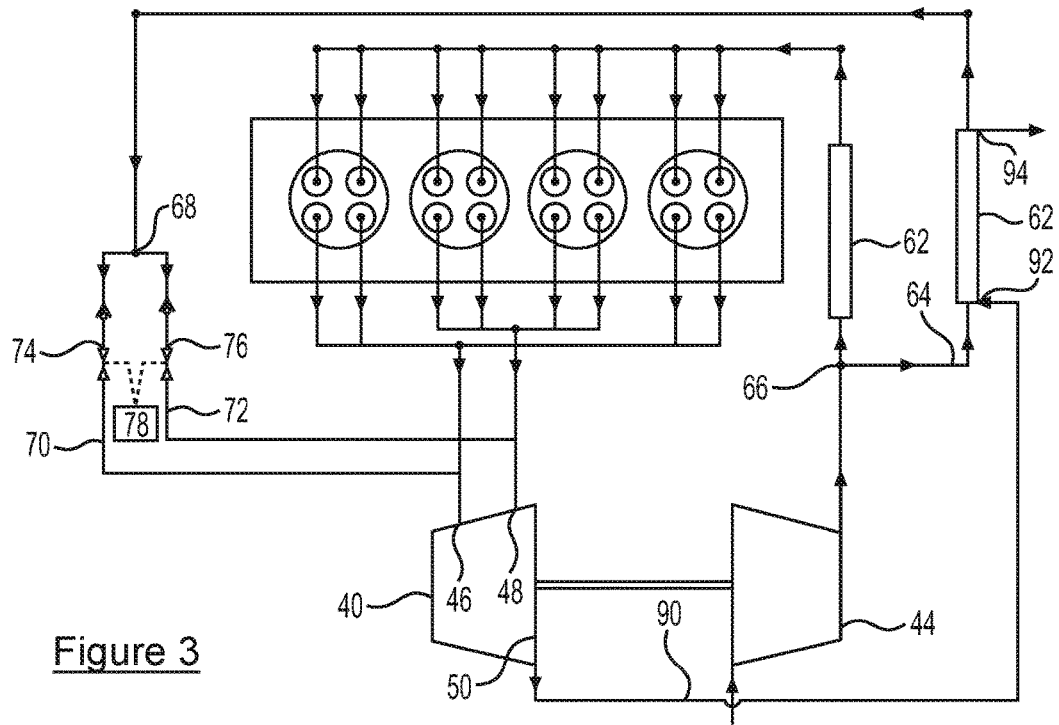
FIG. 3 shows a variant of the internal combustion of FIG. 2 according to the invention.

FIG. 3 shows a variant of FIG. 2 which differs from FIG. 2 in that the flow of exhaust from the turbocharger 40 is fed to one cooling radiator 62 and further compressed air from air compressor 44 flows through point 66 where it is split to flow through two cooling radiators 62.

Figure 3A:
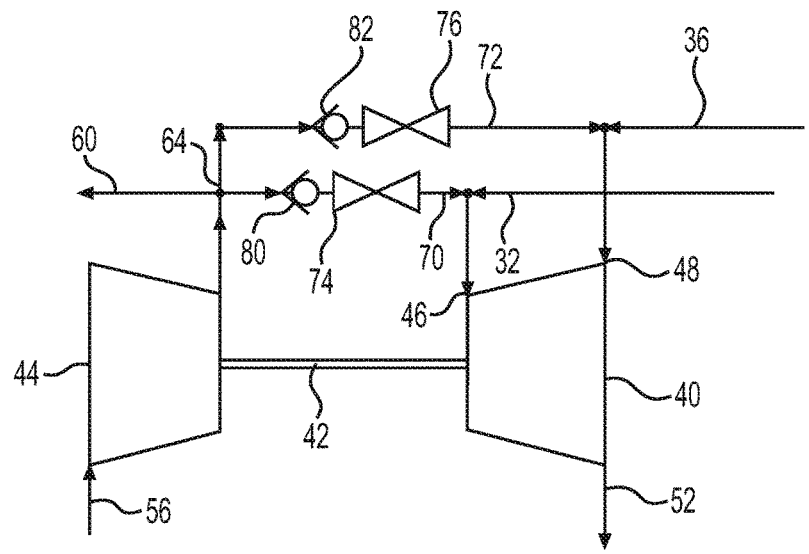
FIGS. 3a, 3b and 3c illustrate three variants of the supercharging device according to FIG. 1 for an internal combustion engine in accordance with the invention.
Figure 3B:
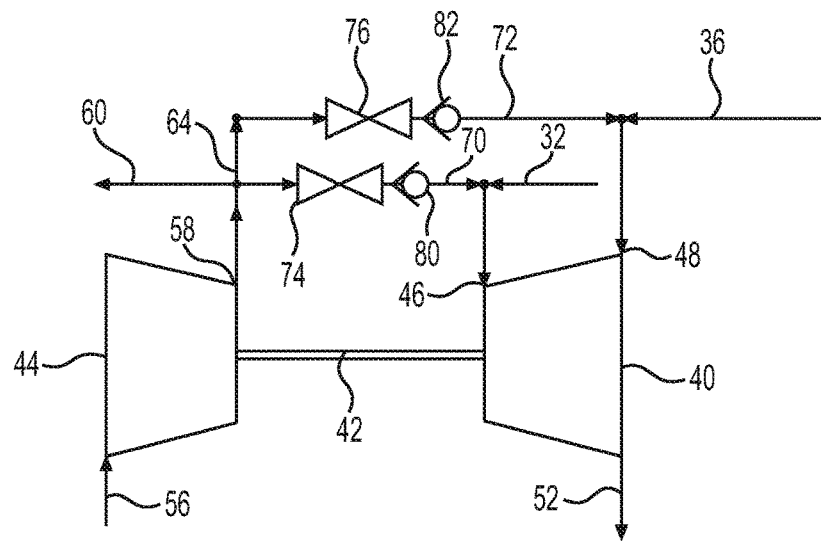
Figure 3C:
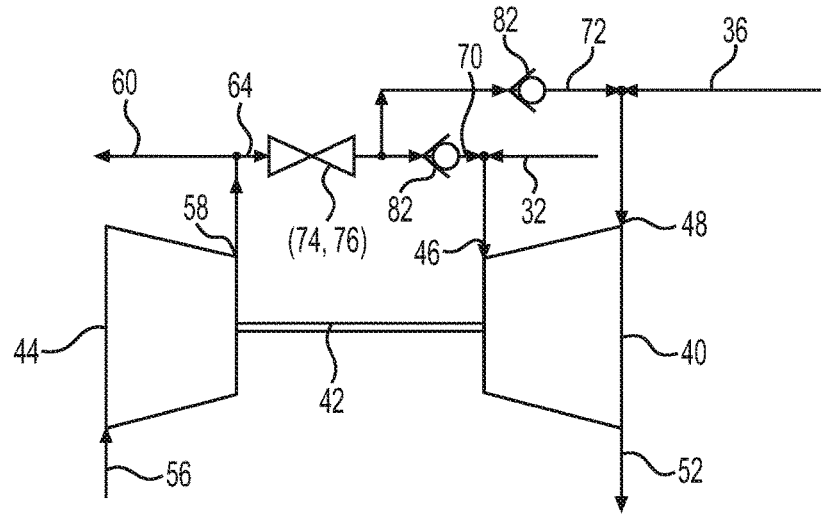

FIGS. 3a, 3b and 3c illustrate more accurately the variants of the control components in the short partial transfer duct of the compressed air.

FIG. 3a shows the two branches 70 and 72 which sweep the twin scroll turbine 40 through its two inputs which are each equipped with a non-return valve 80 and 82 upstream of the proportional valves 74 and 76.

FIG. 3b shows the two branches 70 and 72 which sweep the twin scroll turbine 40 through its two inputs which are each equipped with a non-return check valve 80 and 82 downstream of the proportional valves 74 and 76.

FIG. 3c shows the two branches 70 and 72 which sweep the twin scroll turbine 40 through its two inputs which are each equipped with a non-return check valve 80 and 82 downstream of a single proportional valve 74 and 76 disposed upstream on the compressed air partial transfer duct 64. All the transfer ducts and pieces of control equipment are incorporated in the casing of the turbo-compressor by being either placed on this casing or integrated into the body thereof to have as short as possible lengths and at most a small impact on the motorization environment, as well as a shorter response time.

In one variant, all the transfer ducts 64 and the two branches 70 and 72 which end at the two inputs of the turbo-compressor form an integral part of the casing of the turbo-compressor. In other words, the ducts emerge from the same foundry casting of the casing or are realized during as a specific machining of the casing.

The invention then impacts only on the design and manufacture of the casing of the turbo-compressor which has all the ducts, shut-offs and proportional control valves.

The size of the device according to the invention is then limited to the casing of the turbo-compressor, without having an impact on the environment of the engine.

The invention claimed is:

1. A device for controlling an amount of compressed air provided to an intake of a supercharged internal combustion engine having cylinders connected to the intake and each cylinder having at least one gas outlet coupled to an exhaust manifold comprising:
    a turbo-compressor including a turbine which rotates an outside air compressor which provides compressed air to intakes of the turbine which respectfully receive exhaust gas from different cylinders, a partial transfer duct housed within a body of a casing of the turbo-compressor which comprises two branches which are respectively coupled to different intakes of the turbine to provide compressed air flowing from the outside air compressor through the branches into the intakes of the turbine, the intakes of the turbine also respectfully receiving exhaust gas flowing from the exhaust manifold, each branch including a shut-off valve which controls the circulation of the compressed air in the branch to one of the intakes of the turbine and wherein a length of the partial transfer duct within the casing minimizes a length along which compressed air flows between an outlet of the outside air compressor and the intakes of the turbine which lessens engine response time.

2. A method for controlling an amount of compressed air provided to an intake of a supercharged internal combustion engine having cylinders connected to the intake and each cylinder having at least one gas outlet coupled to an exhaust manifold, a turbo-compressor including a turbine which rotates an outside air compressor which provides compressed air to intakes of the turbine which respectfully receive exhaust gas from different cylinders, a partial transfer duct housed within a body of a casing of the turbo-compressor which comprises two branches which are respectively coupled to different intakes of the turbine to provide compressed air flowing from the outside air compressor through the branches into the intakes of the turbine, the intakes of the turbine also respectfully receiving exhaust gas flowing from the exhaust manifold, each branch including a shut-off valve which controls the circulation of the compressed air in the branch to one of the intakes of the turbine and wherein a length of the partial transfer duct within the casing minimizes a length along which compressed air flows between an outlet of the outside air compressor and the intakes of the turbine which lessens engine response time comprising:
    activating rotation of the outside compressor by operating the supercharged internal combustion engine and controlling the shut-off valves to control an amount of compressed air respectively flowing into each intake of the turbine; and wherein
    a length of compressed air flow between the outside air compressor and the intakes of the turbine is minimized and engine response time is lessened.

3. The device as claimed in claim 1, wherein the branches include a non-return check valve.

4. The method as claimed in claim 2, wherein the branches include a non-return check valve.

5. The device as claimed in claim 1, wherein one of the branches is connected to another of the branches by a connecting duct.

6. The method as claimed in claim 2, wherein one of the branches is connected to another of the branches by a connecting duct.

7. The method as claimed in claim 3, wherein one of the branches is connected to another of the branches by a connecting duct.

8. The method as claimed in claim 4, wherein one of the branches is connected to another of the branches by a connecting duct.

9. The device as claimed in claim 1, wherein the shut-offs comprise proportional valves.

10. The method as claimed in claim 2, wherein the shut-offs comprise proportional valves.

11. The device as claimed in claim 3, wherein the shut-offs comprise proportional valves.

12. The method as claimed in claim 4, wherein the shut-offs comprise proportional valves.

13. The device as claimed in claim 5, wherein shut-offs comprise proportional valves.

14. The device as claimed in claim 1, comprising a connecting duct connecting one of the branches to another of the branches.

15. The method as claimed in claim 2, comprising a connecting duct connecting one of the branches to another of the branches.

16. The device as claimed in claim 1, wherein the partial transfer duct is machined or cast within the body of the casing.

17. The method as claimed in claim 2, wherein the partial transfer duct is machined or cast within the body of the casing.

18. The device as claimed in claim 3, wherein the partial transfer duct is machined or cast within the body of the casing.

19. The device as claimed in claim 5, wherein the partial transfer duct is machined or cast within the body of the casing.

20. The method as claimed in claim 15, wherein the partial transfer duct is machined or cast within the body of the casing.

\* \* \* \* \*